(12) United States Patent
Endoh et al.

(10) Patent No.: US 9,965,625 B2
(45) Date of Patent: May 8, 2018

(54) CONTROL SYSTEM AND AUTHENTICATION DEVICE

(71) Applicant: HITACHI, LTD., Tokyo (JP)

(72) Inventors: Hiromichi Endoh, Tokyo (JP); Tsutomu Yamada, Tokyo (JP); Satoshi Ohkubo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 99 days.

(21) Appl. No.: 15/025,591

(22) PCT Filed: Sep. 5, 2014

(86) PCT No.: PCT/JP2014/073428
§ 371 (c)(1),
(2) Date: Mar. 29, 2016

(87) PCT Pub. No.: WO2015/053019
PCT Pub. Date: Apr. 16, 2015

(65) Prior Publication Data
US 2016/0239662 A1 Aug. 18, 2016

(30) Foreign Application Priority Data
Oct. 7, 2013 (JP) .................................. 2013-209799

(51) Int. Cl.
*G06F 21/55* (2013.01)
*G06F 21/12* (2013.01)
(Continued)

(52) U.S. Cl.
CPC .............. *G06F 21/55* (2013.01); *G06F 21/12* (2013.01); *G06F 21/44* (2013.01); *G06F 21/554* (2013.01); *H04L 63/10* (2013.01)

(58) Field of Classification Search
CPC ....... H04M 1/67; H04M 1/725; H04M 1/7253; H04M 1/72577; G06F 21/31; G06F 21/32;
(Continued)

(56) References Cited

U.S. PATENT DOCUMENTS 8,646,056 B2 * 2/2014 Poplett .................... G06F 21/31
726/2
9,712,656 B2 * 7/2017 Yamaguchi ............. H04M 1/67
(Continued)

FOREIGN PATENT DOCUMENTS

| JP | 2005-517220 A | 6/2005 |
|---|---|---|
| JP | 2006-244508 A | 9/2006 |
| JP | 2007-293678 A | 11/2007 |

OTHER PUBLICATIONS

International Search Report of PCT/JP2014/073428 dated Dec. 16, 2014.

*Primary Examiner* — Thanhnga B Truong
(74) *Attorney, Agent, or Firm* — Mattingly & Malur, PC

(57) ABSTRACT

Provided are a control system and an authentication device capable of detecting abnormality of a development device for distributing a control program and of preventing destruction and tampering of the program caused by the abnormality. To solve the above problem, there is provided: a control device that controls a controlled object; a development device that manages a plurality of control programs executed by the control device and sends the predetermined control program and information accompanying the control program to the network; and an authentication device having an authentication list storing the information accompanying the control program in association with the control program. Upon receiving the control program and the information accompanying the control program from the development device, the authentication device performs authentication (Continued)

whether or not the development device is normal by checking the accompanying information received from the development device with the information stored in the authentication list.

16 Claims, 8 Drawing Sheets

(51) Int. Cl.
*G06F 21/44* (2013.01)
*H04L 29/06* (2006.01)

(58) Field of Classification Search
CPC .. G06F 2221/2115; G06F 9/44; G06F 15/173; G06F 11/36; G06F 9/445; G06F 21/55; H04L 9/00
USPC ......... 235/380; 340/5.65; 709/223; 713/170, 713/176; 704/E15.045; 717/100; 725/35, 34, 46; 726/1–3, 5, 7, 23
See application file for complete search history.

(56) References Cited

U.S. PATENT DOCUMENTS

| | | |
|---|---|---|
| 2002/0183056 A1 | 12/2002 | Lundblade et al. |
| 2007/0079122 A1* | 4/2007 | Han .................. G06F 21/34 713/170 |
| 2007/0198679 A1* | 8/2007 | Duyanovich ....... G06F 11/3409 709/223 |
| 2014/0380264 A1* | 12/2014 | Misra .................. G06F 8/00 717/100 |

* cited by examiner

FIG. 6

| INSTANCE IDENTIFIER | USER | PASSWORD | DEVICE IDENTIFIER | VERSION NUMBER |
|---|---|---|---|---|
| ○○○ | A, B | ×××  | △△ | □□ |
| ○○○ | A | ××× | △△ | □□ |
| ○○○ | A, B, C | ××× | △△ | □□ |
| ⋮ | ⋮ | ⋮ | ⋮ | ⋮ |

CONTROL SYSTEM AND AUTHENTICATION DEVICE

TECHNICAL FIELD

The present invention relates to a device that performs authentication of a control program executed on a control device, and a control system including such device.

BACKGROUND ART

To ensure safe and stable operation of controlled equipment such as a plant, it is necessary to ensure that a control program executed on a control device has been created in an appropriate environment and that the control program has not been destroyed or tampered before execution thereof.

As a background art related to this technical field, in PTL 1, it is described that "the present invention provides safe and secure application distribution and execution by providing systems and methods that test an application to ensure that it satisfies predetermined criteria associated with the environment in which it will execute. Furthermore, by using rules and permission lists, application removal, and a modification detection technique, such as digital signatures, the present invention provides mechanisms to safely distribute and execute tested, or untested, applications by determining whether the application has been modified, determining if it has permission to execute in a given wireless device environment, and removing the application."

CITATION LIST

Patent Literature

PTL 1: Japanese Unexamined Patent Publication No. 2007-293678

SUMMARY OF INVENTION

Technical Problem

In a control system, a control program may be distributed to a control device from a general-purpose computer (hereinafter, referred to as a development device) such as a PC and a server installed with a development environment of the control program. In such configuration, when a software element such as an OS installed in the development device or a communication protocol driven thereby is used by a malicious outsider, there is a possibility that a malfunction occurs in the development device.

In PTL 1, it is disclosed that the developer can detect tampering of a program by using a digital signature when registering an application to a server. The digital signature, however, only indicates that the application to be registered has not been changed since it is out of the developer's hands, whereby it is not effective in a case where a malfunction occurs to the development device itself, which is a problem to be solved by the present invention. This is because in a case where the control program itself in the development device has been destroyed before generation of the signature, for example, the digital signature is generated for the destroyed control program, and the digital signature determines the destroyed control program as valid.

Accordingly, an objective of the present invention is to provide a control system and an authentication device capable of detecting abnormality of the development device itself that distributes the control program and capable of preventing destruction and tampering of the program caused by the abnormality.

Solution to Problem

To solve the above-described problem, for example, a configuration according to claims is employed.

The present application includes a plurality of means to solve the above-described problem, and an example thereof includes: a control device configured to control a controlled object; a development device configured to manage a plurality of control programs executed by the control device and to send the predetermined control program and information accompanying the control program to a network; and an authentication device having an authentication list in which the information accompanying the control program is stored in association with each of the control programs, the authentication device being configured to perform authentication whether or not the development device is normal when receiving the control program and the information accompanying the control program from the development device by checking the accompanying information received from the development device with information stored in the authentication list.

Advantageous Effects of Invention

According to the present invention, it is possible to detect the abnormality of the development device itself that distributes the control program and to prevent the destruction and the tampering of the program caused by the abnormality.

Problems, configurations, and effects other than the above-described ones are clarified in a description of embodiments below.

BRIEF DESCRIPTION OF DRAWINGS

FIG. 6 is a table illustrating an exemplary configuration of an authentication list according to an example of the present application.

DESCRIPTION OF EMBODIMENTS

Hereinafter, an example of the present invention is described by using the drawings.

First Example

In this example, a control system according to a first embodiment of the present application is described.

<Description of a Function and Operation of Each Unit>

Figure 1:
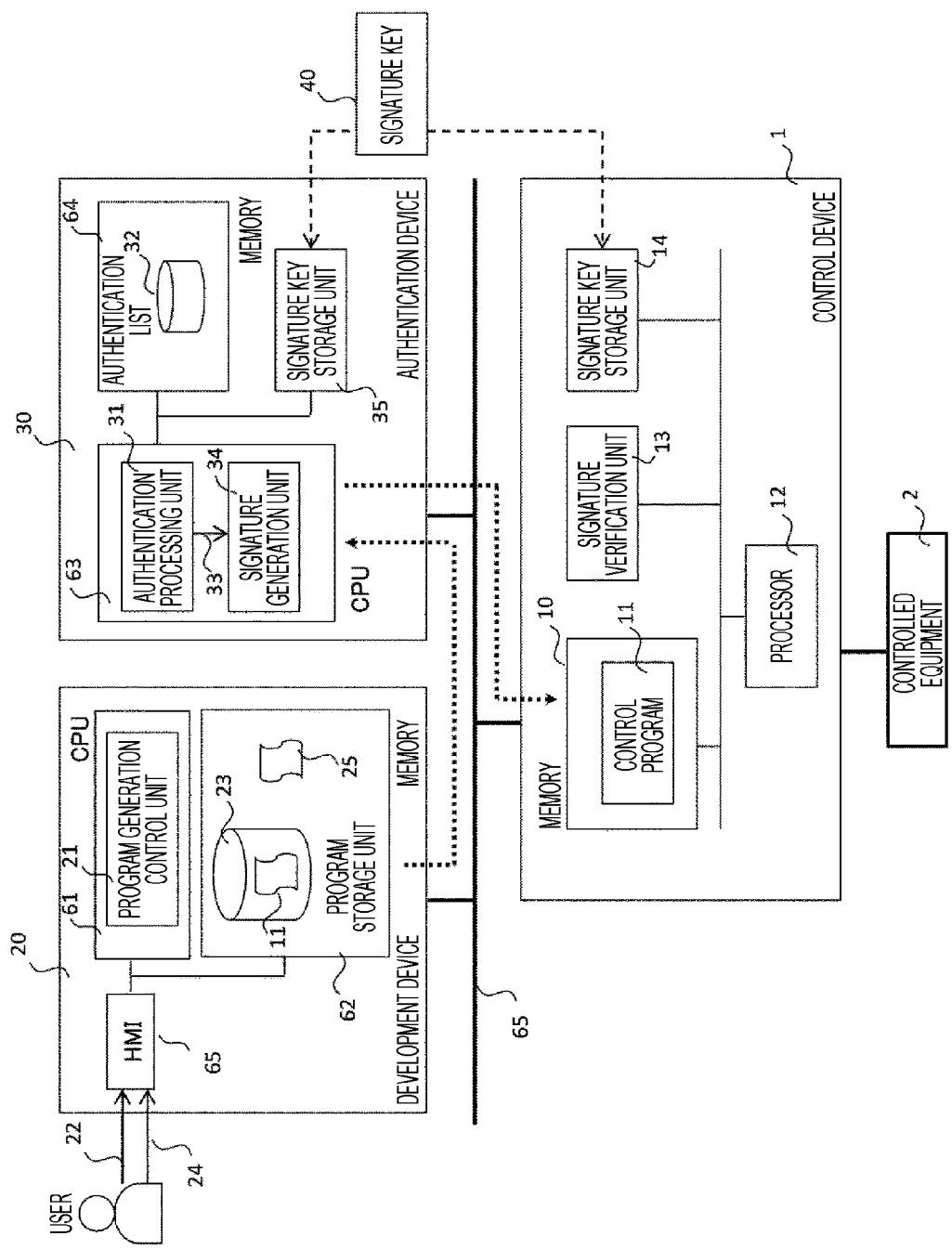
FIG. 1 is a diagram illustrating an exemplary overall configuration of a control system according to an example of the present application.

FIG. 1 is an overall configuration diagram of the control system of this example.

The control system of this example includes: a controlled equipment 2 constituted of various measurement devices, an actuator, and the like; a control device 1 that controls the controlled equipment 2; a development device 20 that distributes a control program executed by the control device 1; and an authentication device 30 that checks soundness of the development device 20 and creates a signature for the control program to be distributed. The control device 1, the development device 20, and the authentication device 30 are connected through a network 65. The control device 1 includes: a memory 10 that stores a control program 11; a processor 12 that executes the control program 11; a signature verification unit 13 that verifies whether or not the signature that has been sent from the authentication device is correct; and a signature storage unit 14 that stores a signature key for creating the signature. These units are mutually connected with a bus. In the control device 1, the control program 11 loaded to the memory 10 is executed by the processor 12, whereby a control command value for the controlled device 2 is calculated. The signature verification unit 14 verifies that the control program 11 to be executed is not changed based on the signature corresponding to the control program and a signature key 40 stored in the signature key storage unit 14, and a result thereof is output as a change detection determination 15 (details of the signature verification unit 14 is described later). The processor 12 refers to the change detection determination 15 when starting execution of the control program 11 and starts the execution of the control program only in a case where a change is not detected.

In this example, the memory 10 and the signature storage unit 14 are provided as different storage devices. Accordingly, even in a case where there is a change to the memory 10, it is possible to securely determine soundness of the control program by using the signature in the signature storage unit 14. Furthermore, in this example, a signature verification unit 25 is provided to the processor 12 as a processing unit specialized in signature verification apart from processing. Accordingly, it is possible to perform the signature verification without increasing a processing load on the processor 12.

The development device 20 includes: a human-machine interface (HMI) 65 constituted of an input device such as a keyboard, a mouse, and a touch panel as well as an output device such as a display and a speaker, a CPU 61, and a memory 62. These units are mutually connected with a bus. The CPU 61 has a program generation control unit 21 that generates the control program as processing to be executed, and the memory 62 has a program storage unit 23 in which the control program 11 is stored, and identification information 25, which is information accompanying the control program 11, is stored in the memory 62. The development device 20 provides a user with a function of creating and accumulating the control program 11. The program generation control unit 21 receives a source code creation operation and an execution format program generation operation 22 from the source code by the user, and the control program 11 is output as a product. The generated control program 11 is accumulated in the program storage unit 23.

The authentication device 30 is constituted of a CPU 63, a memory 64, and a signature key storage unit 35 that stores a signature key for generating a signature. These units are mutually connected with a bus. The CPU 63 includes: an authentication processing unit 31 that authenticates soundness of the development device 20 as processing to be executed; and a signature generation unit 34 that generates a signature for the control program 11. In the memory 64, an authentication list 32 used for authentication of the authentication processing unit 31 is stored. In the authentication device 30, the authentication processing unit 31 verifies the identification information 25 presented by the development device 20 by using the authentication list 32, and a signature generation permission determination 33 is output. The signature generation unit 34 refers to the control program 11, which is output from the development device 20, and the authentication key 40 stored in the authentication key storage unit 35, and a signature 36 corresponding to the control program is generated (details of the signature generation unit 34 are described later).

Note that the same signature key 40 is stored in advance in the signature key storage unit 35 of the authentication device 30 and the signature key storage unit 14 of the control device 1. In this storing processing, the signature key 40 may be directly stored in each of the devices or stored through the network 65.

<Authentication of the Program>

Next, authentication of the control program is described.

In a case where a malfunction or takeover occurs to the development device 20 caused by a malicious outsider, it is not possible to ensure validity of the control program 11 generated by the development device 20 in the first place. Thus, first, it is necessary to confirm that the control program 11 has been created in a sound environment by authenticating the development device 20 by the authentication device 30.

In this example, an example is described in which the authentication is performed by using information that is difficult to be reproduced in a case where the malfunction or the takeover occurs to the development device 20.

First, when loading the created control program 11 to the control device 1, the user gives a program registration instruction 24 to the program generation control unit 21. This operation is performed through the HMI 65, and more specifically, it is executed by using the input device such as the keyboard, the mouse, and the touch panel. At this time, the user inputs an instance identifier 110, which is information for identifying the control program 11 to be loaded, and a device identifier (also called an ID, an address, or the like) 111 of the control device 1 to be a loading destination of the control program.

When the program registration instruction 24 is input by the user, first, the program generation control unit 21 searches the control program associated with the instance identifier 110, which has been input by the user, from the program storage unit 23. When there is a corresponding one, the program generation control unit 21 acquires the control program 11, which is entity thereof, and acquires a version number 112 of the control program.

Figure 5:
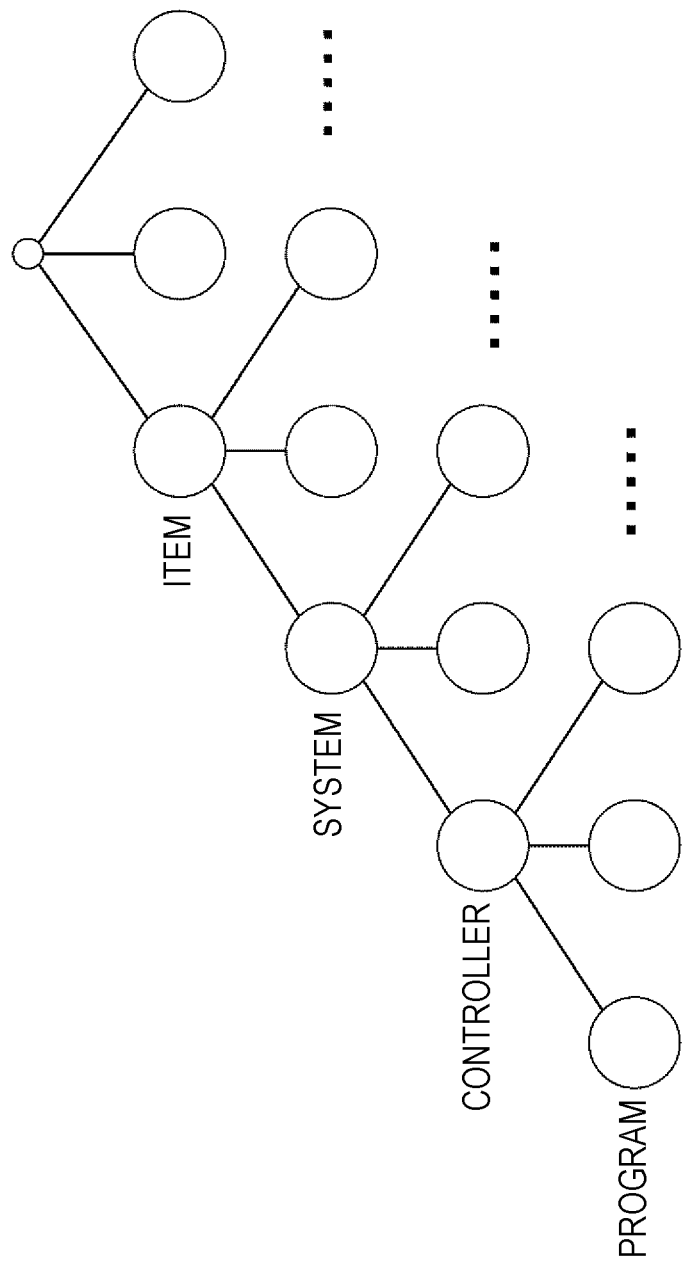
FIG. 5 is a diagram illustrating an exemplary configuration of a program storage unit according to an example of the present application.

FIG. 5 is a conceptual diagram illustrating a data configuration of the program storage unit 23. In the program storage unit 23, the control program is stored in a tree-like hierarchy. The hierarchy is constituted of an item name, a system name, a controller name, and a control program. By searching information corresponding to each layer input by the user, it is possible to extract the desired control program. Note that the control program, which is at the lowest layer, is stored in association with the instance identifier 110, the device identifier 111, the version number 112, and the like.

Figure 2:
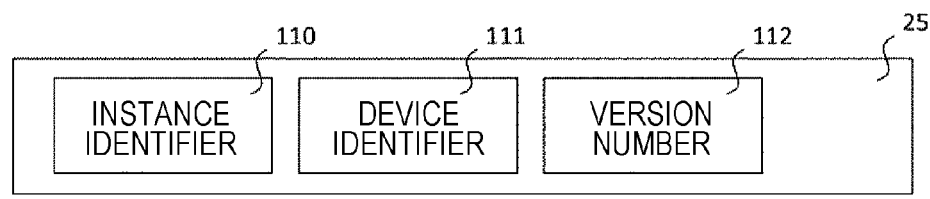
FIG. 2 is a diagram illustrating an exemplary configuration of identification information according to an example of the present application.

Next, by using the instance identifier 110, the device identifier 111, and the version number 112, the program generation control unit 21 generates the identification information 25, which is stored in the memory 62 and presented to the authentication processing unit 31 together with the control program 11. Here, it is also possible to encrypt the control program 11 with a password. FIG. 2 is a diagram illustrating a data configuration of the identification information 25. The identification information 25 is constituted of the instance identifier 110, the device identifier 111, and the version number 112. In addition, it is also possible to include the password related to the control program 11 and user information of a user operating the development device.

In the control system, an instance of a different control program is loaded to the control device having a different ID, and the control program is version upgraded as necessary for an adjustment of a control parameter and the like, whereby it is difficult for an outsider to accurately reproduce the information pretending to be an authorized user. On the other hand, the information is known to the authorized user of a conventional control system as well, whereby it is possible to determine whether the development device 20 is sound or not by confirming the information.

Note that as a procedure for transmitting the identification information 25 from the development device 20 to the authentication processing unit 31 and for determining the identification information 25 in the authentication processing unit 31, a challenge-response method, an S/KEY method, and the like known in a field of information security may be applied.

The challenge-response method is an authentication method between a server and a client, each having a common password. It is the method of authenticating in which the server sends a random number to the client, the client returns the random number encrypted with the password held by the client to the server, and the server checks the returned information with the random number, which is sent by the server and encrypted with the password held by the server, and verifies whether or not these match with each other. Accordingly, it is possible to perform the authentication by avoiding the password from flowing in a communication path as it is.

The S/KEY method is also an authentication method between a server and a client, each having a common password. It is the method of authenticating in which the server sends information of the password that is encrypted N fold with a hash function to the client, the client returns the information of the password that is encrypted N−1 fold, and the server multiplies the received information that is encrypted N−1 fold by the hash function and compares the information with the information that is encrypted N fold held by the server. In the same way, by this method, it is possible to perform the authentication by avoiding the password from flowing in the communication path.

By using these methods, it is possible to avoid the identification information 25 from being sent as it is in the communication path between the development device 20 and the authentication device 30, whereby it is possible to prevent the identification information 25 from being leaked due to wiretapping and the like of the communication path and from being abused in the authentication thereafter.

Next, processing on a side of an authentication device 31 is described.

FIG. 6 is a table illustrating a configuration of the authentication list 32. In the authentication list 32, user information of a user capable of sending the program, the password, the device identifier, the version number, and the like are stored in association with the instance identifier, which is identification information of the control program.

On the side of the authentication processing unit 31, the identification information 25, which is presented by the development device 20, is searched from the authentication list 32. In a case where there is an entry of a matching device, the authentication processing unit 31 determines that authentication is successful, and the signature generation permission determination 33 is output. More specifically, by using the instance identifier of the control program 11 sent from the development device 20 as a key, the authentication processing unit 31 searches corresponding information from the authentication list 32 and determines whether or not the information matches with the identifier 25, which is presented by the development device 20.

Furthermore, the authentication processing unit 31 outputs the signature generation permission determination 33 to outside of the authentication device 30 to confirm a cause in a case where execution of the control program fails in the control device 1 or to confirm an operating condition of the authentication device. The signature generation permission determination 33, which has been output to the outside, may be presented to the user by a display device or may be recorded as log information in an external recording medium and the like.

<Generation and Verification of the Signature>

Next, generation and verification of the signature corresponding to the control program 11 are described with reference to FIGS. 3 and 4.

Figure 3:
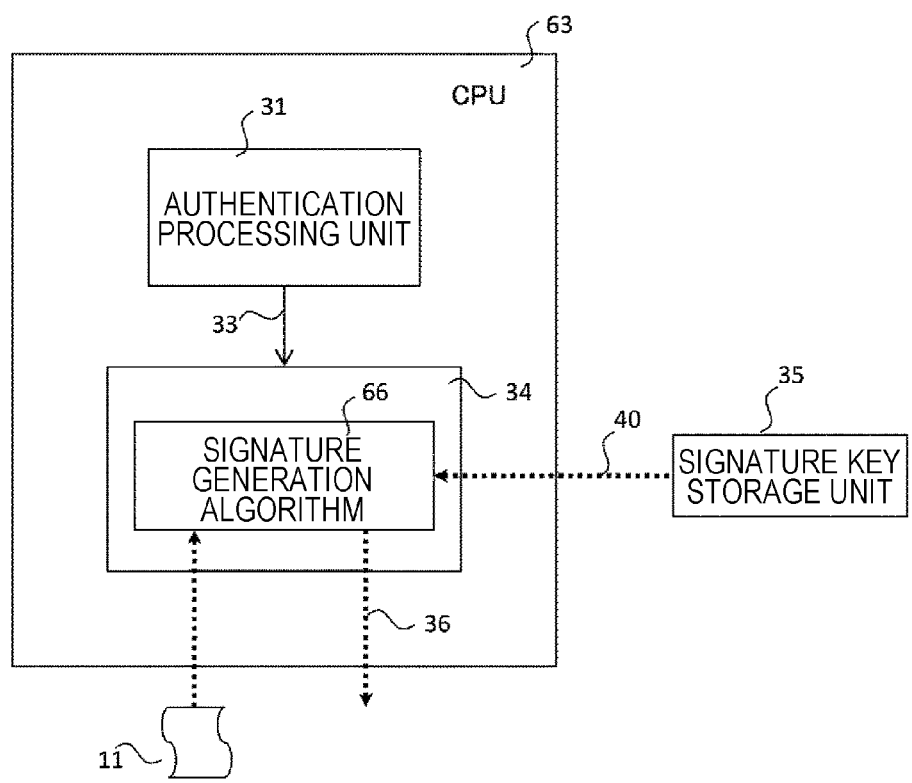
FIG. 3 is a diagram illustrating a method of generating a signature according to an example of the present application.

FIG. 3 is a diagram illustrating a method of generating the signature corresponding to the control program 11 by the authentication device 30.

When the program registration instruction 24 is input by the user to the development device 20, the identification information 25 is presented to the authentication device 30 as described above. At that time, the control program 11 acquired from the program storage unit 23 is output to the signature generation unit 34.

To the signature generation unit, in a case where the control program 11 is input from the program storage unit 23 and the signature generation permission determination 33 is input from the authentication processing unit 31, the signature generation unit inputs the control program 11 and the signature key 40 stored in the signature key storage unit 35 to a signature generation algorithm 66 to generate the signature 36. As a signature generation algorithm 50, it is possible to arbitrary select from a keyed hash algorithm and an encrypted hash value in which output of a hash algorithm is encrypted that are known in the field of information security as well as an algorithm designed for a similar purpose. The signature generation unit 34 sends the signature 36 generated as above to the control device 1 together with the control program 11.

The control device 1 captures the control program 11 and the signature 36 from the signature generation unit 34, which are loaded to the memory 10. At this time, an address to which they are loaded is recorded, for example, as additional information in a case where the control program 11 is sent as a file and is referenced during loading to the memory 10.

By using the control program 11 and the signature 36 loaded to the memory 10, the signature verification unit 13 verifies whether or not the control program 11 has been changed.

Figure 4:
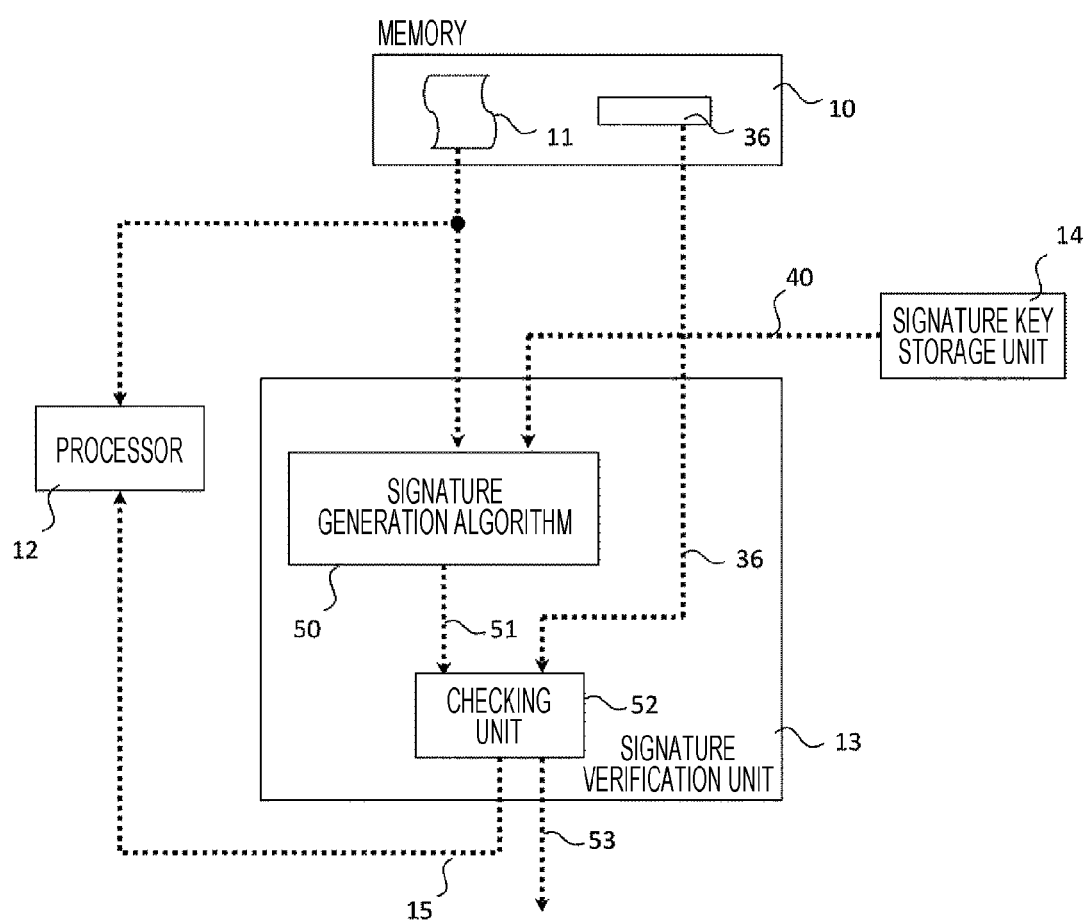
FIG. 4 is a diagram illustrating a method of verifying a signature according to an example of the present application.

FIG. 4 is a diagram illustrating a method of verifying the control program 1 in the control device 1.

First, the control program 11 in the memory 10 and the signature key 40 stored in the signature key storage unit 14 are input to the signature generation algorithm 50. Here, the signature algorithm 50 is the same as the signature algorithm 66 of the authentication device 63. Although not illustrated, in actuality, a procedure is taken in which the processor 12 reads the control program 11 and the signature key 40, which are input to the signature generation algorithm 50 (the same applies hereafter). The signature generation algorithm 50 outputs a test signature 51 as a calculation result. Next, the processor 12 inputs the test signature 51 and the signature 36 to a comparison unit 52, and a change detection determination output 15 corresponding to a comparison result is output to the processor 12. When the test signature 51 matches with the signature 36, it is determined that there is no change to the control program 11, whereby execution of the control program 11 by the processor 12 is permitted. On the other hand, when the test signature 51 does not match with the signature 36, it is determined that there is a change to the control program 11, whereby a predetermined warning 53 is output.

Figure 7:
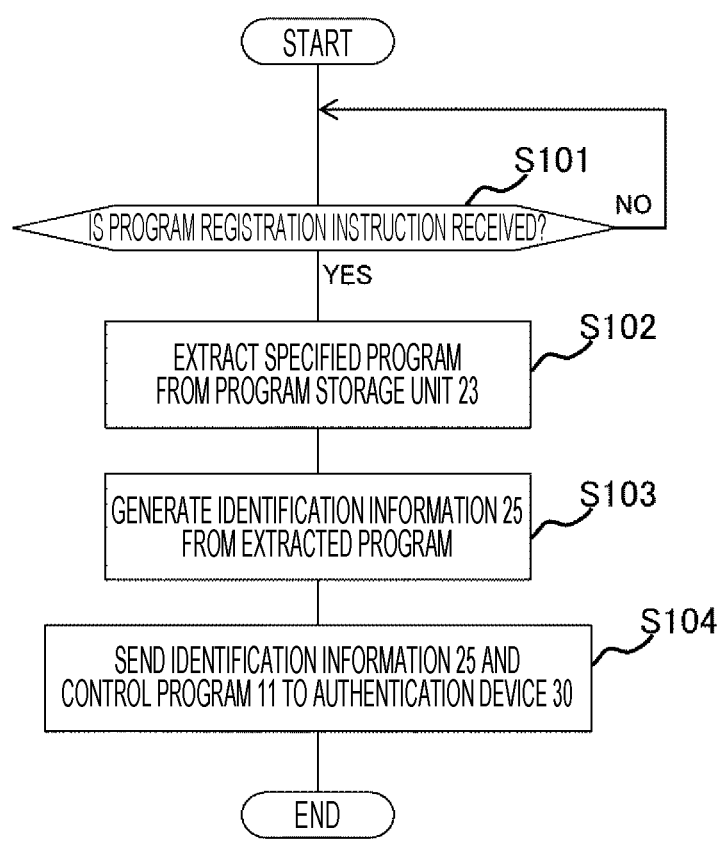
FIG. 7 is a chart illustrating a processing flow of a development device according to an example of the present application.

FIG. 7 is a processing flowchart illustrating a flow of processing of the development device 20. The development device 20 waits until receiving a registration instruction of the program from the user (NO in S101), and upon receiving the registration instruction (YES in S101), the development device 20 extracts the specified control program 11 from the program storage unit 23 (S102). Next, the development device 20 generates the identification information 25 from the control program 11 that has been extracted (S103), and it sends the identification information 25 and the control program 11 to the authentication device 30 (S104).

Figure 8:
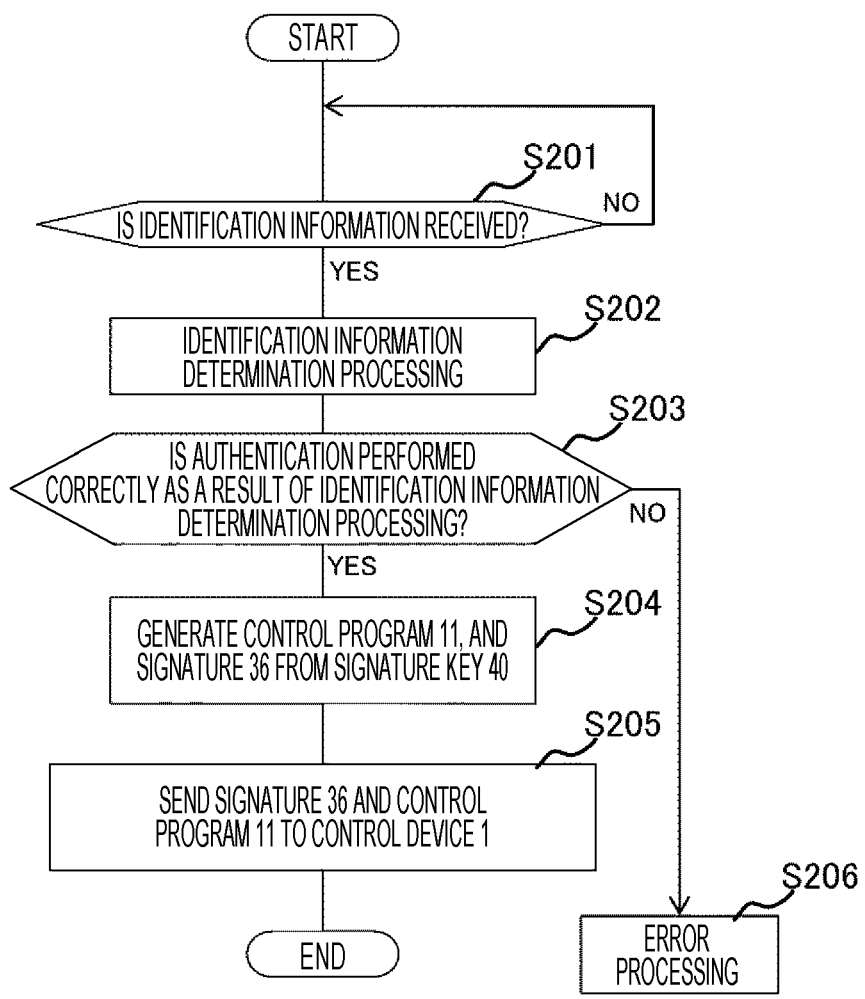
FIG. 8 is a chart illustrating a processing flow of an authentication device according to an example of the present application.

FIG. 8 is a processing flowchart illustrating a flow of processing of the authentication device 30. The authentication device 30 waits until the identification information 25 is presented by the development device 20 (NO in S201), and upon being presented with the identification information (YES in S201), the authentication device 30 performs determination processing of the above-described identification information (S202). In a case where authentication is not performed correctly as a result of the identification information determination processing (NO in S203), error processing is performed (S206). In a case where the authentication is performed correctly (YES in S203), the authentication device 30 generates the control program 11, and the signature 36 from the signature key 40 (S204). Next, the authentication device 30 sends the signature 36 and the control program 11 to the control device 1 (S205).

Figure 9:
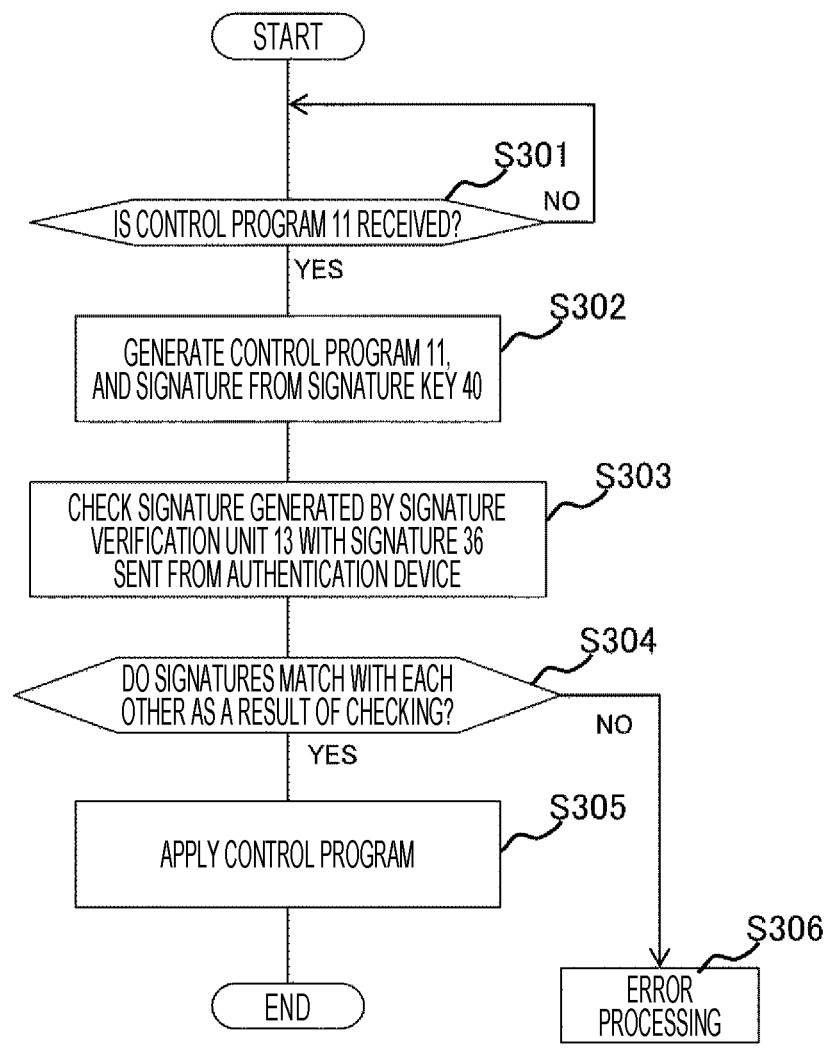
FIG. 9 is a chart illustrating a processing flow of a control device according to an example of the present application.

FIG. 9 is a processing flowchart illustrating a flow of processing of the control device 1. The control device 1 waits until receiving the control program 11 from the authentication device 30 (NO in S301), and upon receiving the control program 11 (YES in S301), the control device 1 generates a signature by using the control program 11 that has been received and the signature key 40 stored in the signature key storage unit 14 (S302). Next, the signature generated by the signature verification unit 13 and the signature 36 sent from the authentication device 30 are checked (S303). In a case where the signatures do not match with each other as a result of checking (NO in S304), error processing is performed (S306). In a case where the signatures match with each other as the result of checking (YES in S304), the control device 1 determines that the control program 11 that has been sent is normal and executes the program.

According to the above-described operation, in the control system according to this example, the authentication device receives the control program created by the development device and generates the signature corresponding to the control program only in a case where the identification information indicating that the development device is sound is presented. By performing verification using the control program, which has been loaded from the authentication device, and the signature, which has been generated in the above-described procedure, for the control program in the control device, it becomes possible to verify that the control program has been created in a sound environment without a malfunction or takeover and that the control program has not been changed prior to loading to the control device. Accordingly, it is possible to prevent the control program that has been destroyed or tampered by a malfunction or takeover of the development device from being falsely recognized as authentic and being distributed to and executed on the control device. Note that as a modification of this example, a configuration in which, instead of the control device 1 loading the control program 11 from the authentication device 30, the control device 1 loads the control program 11 from the development device 20 is also possible. According to the modification, the control program 11 and the signature 36 therefor exist on completely different devices, whereby unless both of the development device 20 and the authentication device 30 are taken over and both of the control program 11 and the signature 36 are tampered, the tampered control program 11 is not executed on the control device 1, whereby it is possible to further enhance security.

Note that the CPU and the processor of the control device 1, the development device 20, and the authentication device 30 are used for forwarding a program from a nonvolatile storage medium to the memory and for executing the program. As the program to be executed, an operating system and an application program operating on the OS may be exemplified.

Furthermore, the control device 1, the development device 20, and the authentication device 30 have a communication function with the network 65. This communication function includes receiving a communication request from the program executed by the CPU and the processor as well as communicating with the network 65. As the communication function, an IC such as a media access control (MAC) chip, a physical layer (PHY) chip, a hybrid chip of MAC and PHY, a FPGA, a CPLD, an ASIC, and a gate array may be exemplified. Note that such communication function may also be included in a chipset that controls the CPU, the processor, or an information channel inside a computer.

Furthermore, as the bus within the control device 1, the development device 20, and the authentication device 30, a PCI bus, an ISA bus, a PCI express bus, a system bus, and a memory bus may be exemplified.

Note that the present invention is not to be limited to the above-described examples and may include various modifications. For example, the above-described examples have been described in detail so as to facilitate understanding of the present invention, whereby the examples are not necessarily limited to ones provided with all configurations described. It is possible to replace apart of the configuration of one example with the configuration of another example or to add the configuration of another example to the configuration of one example. Furthermore, addition, deletion, or replacement of another configuration is possible to a part of the configuration of each of the examples.

A part or all of the above-described configuration, function, processing unit, processing means, and the like may also be achieved by hardware such as by designing, for example, with an integrated circuit. The above-described configuration, function, and the like may also be achieved by software by interpreting and executing a program for achieving each function by a processor. Information such as a program, a table, a file, and the like for achieving the function may be put on a semiconductor memory, a recording device such as a hard disk, or on a recording medium using magnetic or light.

Note that only a control line and an information line considered to be necessary for describing are illustrated, and not all of the control lines and the information lines of the product are illustrated. In actuality, it may be regarded that almost all of the configurations are mutually connected.

REFERENCE SIGNS LIST 1 control system
2 controlled equipment
10 memory
11 control program
12 processor
13 signature verification unit
14 signature key storage unit
15 change detection determination
20 development device
21 program generation control unit
22 source code creation and program generation operation
23 program storage unit
24 program output instruction
25 identification information
30 authentication device
31 authentication processing unit
32 authentication criteria information
33 signature generation permission determination
34 signature generation unit
35 signature key storage unit
40 signature key
61 CPU
62 memory
63 CPU
64 memory
65 network
66 signature generation algorithm

The invention claimed is:

1. A control system comprising:
a control device configured to control a controlled object;
a development device configured to manage a plurality of control programs executed by the control device and to send a control program and information accompanying the control program to a network; and
an authentication device having an authentication list in which the information accompanying the control program is stored in association with each of the control programs as authentication information for the control programs, the authentication device being configured to perform authentication whether or not the development device is normal when receiving the control program and the information accompanying the control program from the development device by checking the accompanying information received from the development device with the authentication information for the control program stored in the authentication list;
wherein the development device is normal if the accompanying information received from the development device matches the authentication information for the control program stored in the authentication list, and the development device is not normal if the accompanying information received from the development device does not match the authentication information for the control program stored in the authentication list; and
wherein the information accompanying the control program comprises identification information generated using an instance identifier for identifying the control program, a device identifier identifying the control device to be an object, and version information of the control program.

2. The control system according to claim 1, wherein in a case where the development device is determined as normal as a result of the authentication, the authentication device generates a signature from the received control program and sends the signature to the control device.

3. The control system according to claim 2, wherein upon receiving the control program from the development device or the authentication device, the control device generates a signature based on the received control program and executes the control program in a case where a match is obtained by checking the generated signature with the signature received from the authentication device.

4. The control system according to claim 3, wherein a common signature key is stored in advance in the authentication device and the control device, and each of the authentication device and the control device generates a signature from the control program by using the signature key stored therein.

5. The control system according to claim 1, wherein the information accompanying the control program further comprises a password.

6. An authentication device connected to a control device configured to control a controlled object and to a development device configured to generate a control program through a network, the authentication device comprising:
a memory configured to store an authentication list in which information accompanying the control program is associated with each of the control programs as authentication information for the control programs; and
an authentication processing unit configured to perform authentication whether or not the development device is normal upon receiving the control program generated by the development device and the information accompanying the control program through the network by searching whether or not the accompanying information received from the development device matches the authentication information for the control program stored in the authentication list, to generate a signature from the control program that has been received in a case where the development device is determined as normal, and to send the signature to the control device;
wherein the development device is normal if the accompanying information received from the development device matches the authentication information for the control program stored in the authentication list, and the development device is not normal if the accompanying information received from the development device does not match the authentication information for the control program stored in the authentication list; and
wherein the information accompanying the control program comprises identification information generated using an instance identifier for identifying the control program, a device identifier identifying the control device to be an object, and version information of the control program.

7. The authentication device according to claim 6, wherein in a case where the development device is determined as normal as a result of the authentication, the authentication processing unit generates a signature from the received control program and sends the signature to the control device.

8. The authentication device according to claim 7, wherein a common signature key is stored in advance in the authentication device and the control device, and the authentication device generates a signature from the control program by using the signature key stored therein.

9. The authentication device according to claim 6, wherein the information accompanying the control program further comprises a password.

10. The control system according to claim 3, wherein the control device executes the control program to control the controlled object in the case where a match is obtained by checking the generated signature with the signature received from the authentication device.

11. A control method for a control system that includes a control device configured to control a controlled object, a development device configured to manage a plurality of control programs executed by the control device and to send a control program and information accompanying the control program to a network, and an authentication device having an authentication list in which the information accompanying the control program is stored in association with each of the control programs as authentication information for the control programs, the control method comprising:

performing, by the authentication device, authentication whether or not the development device is normal when receiving the control program and the information accompanying the control program from the development device by checking the accompanying information received from the development device with the authentication information for the control program stored in the authentication list;

wherein the development device is normal if the accompanying information received from the development device matches the authentication information for the control program stored in the authentication list, and the development device is not normal if the accompanying information received from the development device does not match the authentication information for the control program stored in the authentication list; and wherein the information accompanying the control program comprises identification information generated using an instance identifier for identifying the control program, a device identifier identifying the control device to be an object, and version information of the control program.

12. The control method according to claim 11, further comprising:

in a case where the development device is determined as normal as a result of the authentication, generating, by the authentication device, a signature from the received control program and sending the signature to the control device.

13. The control method according to claim 12, further comprising:

upon receiving the control program from the development device or the authentication device, generating, by the control device, a signature based on the received control program and executing the control program in a case where a match is obtained by checking the generated signature with the signature received from the authentication device.

14. The control method according to claim 13, further comprising:

storing a common signature key in advance in the authentication device and the control device, wherein each of the authentication device and the control device generates a signature from the control program by using the signature key stored therein.

15. The control method according to claim 13, wherein the control device executes the control program to control the controlled object in the case where a match is obtained by checking the generated signature with the signature received from the authentication device.

16. The control method according to claim 11, wherein the information accompanying the control program further comprises a password.

* * * * *